United States Patent [19]

Gerber et al.

[11] Patent Number: 4,781,089
[45] Date of Patent: Nov. 1, 1988

[54] LONGITUDINAL CUTTING OF A FIBROUS TUBULAR PRODUCT

[75] Inventors: Gerard Gerber; Andre Leblond, both of Choisy Au Bac, France

[73] Assignee: Isover Saint-Gobain, Aubervilliers, France

[21] Appl. No.: 757,091

[22] Filed: Jul. 19, 1985

[30] Foreign Application Priority Data

Jul. 20, 1984 [FR] France .................. 84 11512

[51] Int. Cl.$^4$ .............................................. B26D 1/04
[52] U.S. Cl. .......................................... 83/51; 83/54; 83/191; 83/879
[58] Field of Search ................... 83/54, 431, 856, 857, 83/425, 191, 51, 862, 865, 879, 883, 875; 29/620

[56] References Cited

U.S. PATENT DOCUMENTS

| | | | |
|---|---|---|---|
| 3,605,534 | 9/1971 | Barr | 83/875 X |
| 3,745,621 | 7/1973 | Andrews et al. | 83/862 X |
| 3,905,097 | 9/1975 | Beetle | 29/620 |
| 4,080,235 | 3/1978 | Mandersson | 156/218 |
| 4,160,398 | 7/1979 | Bichot et al. | 83/54 X |

FOREIGN PATENT DOCUMENTS

| | | |
|---|---|---|
| 0063869 | 11/1982 | European Pat. Off. . |
| 1815380 | 7/1970 | Fed. Rep. of Germany . |
| 2132843 | 1/1973 | Fed. Rep. of Germany . |
| 2841236 | 4/1980 | Fed. Rep. of Germany . |
| 2281880 | 3/1976 | France . |
| 2271006 | 12/1978 | France . |
| 345206 | 4/1960 | Switzerland . |

Primary Examiner—Frank T. Yost
Attorney, Agent, or Firm—Pennie & Edmonds

[57] ABSTRACT

Method for longitudinal cutting of a wall of a fibrous tubular product in a step shaped profile. The apparatus comprises two parallel main blades which form radial cuts into the wall, slightly displaced from each other. One cut is made radially inward from the outer surface; and the other cut is made radially outward from the inner surface. Each cut extends toward the center of the shell wall to a depth approximately one half the thickness of the shell wall. A third cut is made within the shell wall perpendicular to and joining the other two cuts. These three cuts form a smooth step shaped cut through the wall and facilitate installation of the shell around conduit while minimizing heat loss and mechanical stresses within the wall.

2 Claims, 4 Drawing Sheets

LONGITUDINAL CUTTING OF A FIBROUS TUBULAR PRODUCT

BACKGROUND OF THE INVENTION

The present invention relates to a method and apparatus for the cutting of a fibrous tubular product, and more specifically, to the longitudinal cutting of the wall of a fibrous tubular product in a step-shaped profile.

The fibrous tubular product is a hollow cylinder formed of fibers, such as, for example, glass fibers, held together by a polymerized binder. The tubular product is formed by impregnating a mat of fibers with a sizing composition, wrapping the impregnated fibers around a heated mandrel to form a tube or shell, and polymerizing the sizing in a polymerization oven. Such a product typically is used for insulation of conduits. A longitudinal cut along the shell to open and close the shell is necessary to place the shell around conduit. However, a single radial cut along the shell can give rise to undesirable heat losses.

A process is known where insulating shells are cut to obtain a step shaped profile so that the walls, when closed around the conduit, overlap at the step, thus limiting heat loss. According to this known process, two substantially parallel cuts are made into the shell wall from opposite sides of the wall. These two cuts are displaced slightly and only partially extend into the shell wall. To obtain a complete cut through the shell wall, shearing forces are applied near the edges of the slits within the wall. These forces act on the material between the parallel slits and tend to tear it.

Such a process has the disadvantage of inducing mechanical stresses in the fibrous product. These stresses can weaken and disintegrate the fibrous structure and result in irregular cut profiles leading to incomplete closing and therefore excessive heat loss.

SUMMARY OF THE INVENTION

The present invention is a method and apparatus for cutting a longitudinal step-shaped slit in the wall of a fibrous tube by simultaneously cutting from the inner surface of the wall by one blade and from the outer surface of the wall by another blade. These two cuts are substantially radial in nature, approximately parallel to each other, and slightly displaced from each other. They extend only partially into the wall of the tube, preferably to the center of the wall. A third cut is simultaneously made within the tube wall substantially perpendicular to and joining the two radial cuts. The relative position of the tube and the third blade is adjusted so that the third cut will be made completely within the tube wall.

According to another embodiment, the invention is a process whereby compression forces are created and exerted from the inner surface of the tube wall toward the center of the wall simultaneously with compression forces from the outer surface of the tube wall also towards the center of the wall. These combined forces reach their maximum at the center of the wall, in an area between the planes of the two main blades. Acting opposite this force is the force of the third blade which produces the tangential cut to complete the slit. Thus, a certain balancing of forces is exerted in the central area, reducing the risk of damage to the product. In addition, the third blade serves to stabilize the position of the product to be cut relative to the cutting tool.

According to a preferred embodiment of the invention, a balancing of forces that is not limited to the central zone of the wall is achieved through the use of additional blades. In particular four radial cuts are started instead of just two, resulting in a step-shaped slit with the fibrous structure experiencing even smaller mechanical stresses. These two additional cuts are started from the edges of the tangential cut; one cut extends from the center of the wall toward the outer surface of the wall and the other cut extends from the center of the wall toward the inner surface of the wall. These two radial cuts join the two other radial cuts started from the outer surface and the inner surface which extend to the center of the wall.

The invention also relates to a method and apparatus for forming a longitudinal slit on the inner surface of the wall opposite the step-shaped slit. This slit only partially extends into the wall, facilitating installation of the tube around a conduit.

BRIEF DESCRIPTION OF THE DRAWINGS

These and other objects, features, and advantages of the invention will become more readily apparent with reference to the following description of a preferred embodiment of the invention in which.

DETAILED DESCRIPTION OF THE INVENTION

Figure 3:
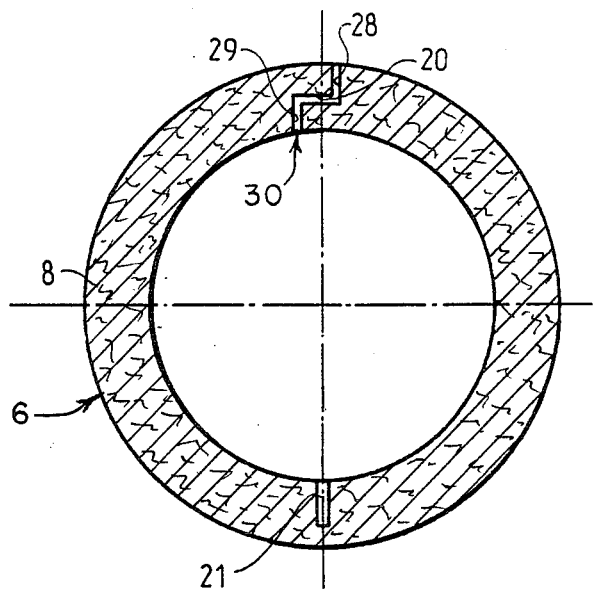
FIG. 3 shows a cross section of the tubular product as viewed along its axis after being cut in accordance with the invention.

The invention is a method and apparatus for forming a step-shaped slit 30 in a wall 8 of a fibrous tubular shell 6 shown in cross-section in FIG. 3. As seen at the top of a cross section, slit 30 comprises at least three cuts 28, 20, 29. The cuts are simultaneously made and join each other so as to cut entirely through wall 8 of the shell.

Two of the cuts are substantially radial in nature, approximately parallel to each other and slightly displaced from each other. One cut 28 is formed from the outer surface of wall 8 radially inward to a depth approximately one-half the thickness of the wall; the other cut 29 is formed from the inner surface of the wall radially outward to a depth approximately one-half the thickness of the wall. Third cut 20 is simultaneously made within the wall, approximately perpendicular to the planes of the radial cuts and tangential to the wall, so as to join cuts 28, 29 and complete the step-shaped slit through the wall.

In another embodiment of the invention, not two, but four radial cuts are made to obtain the desired step-shaped slit. The two additional cuts further reduce mechanical stresses within the wall. In such embodiment, the two additional cuts are started from a certain level within the wall, preferably at the center of the wall. One cut is directed from the center of the wall toward the outer surface of the wall to join the cut started from the outer surface of the wall; the other cut is directed from the center of the wall toward the inner surface of the wall to join the cut started from the inner surface of the wall.

The simultaneity of the cuts and the proper joining of the cuts to each other are assured by the proper placement and rigidity of the various blades on the cutting tool. As shown in FIG. 2, a cutting tool of the present invention comprises blades 2 and 3 for making the radial cuts 28, 29 and blade 17 for making the center or tangential cut 20. Blades 2 and 3 are separated by the plane P of blade 17, approximately perpendicular to the planes of blades 2 and 3. The apparatus further comprises an additional blade 10 shown in FIG. 1 which forms a longitudinal slit 21 on the inside of the wall 8 opposite step-shaped slit 30. As shown in FIG. 3, this slit is radial in nature, extends along the length of the fibrous tubular product, but penetrates only partially into the wall of the shell. This partial slit faciliates opening the fibrous tubular product.

Figure 1:
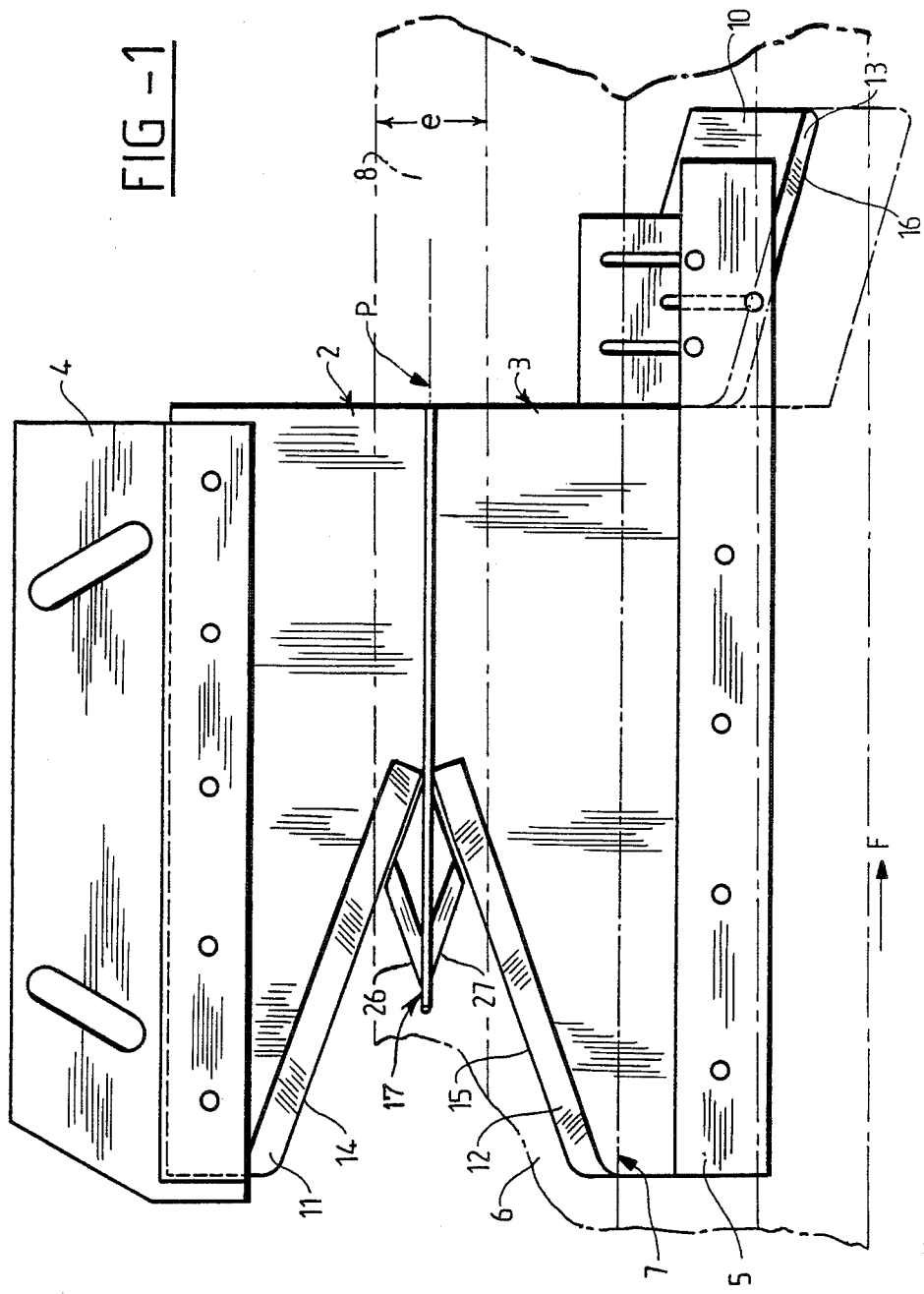
FIG. 1 is a front view showing the position of a cutting tool of the present invention relative to a tubular product to be cut.
Figure 2:
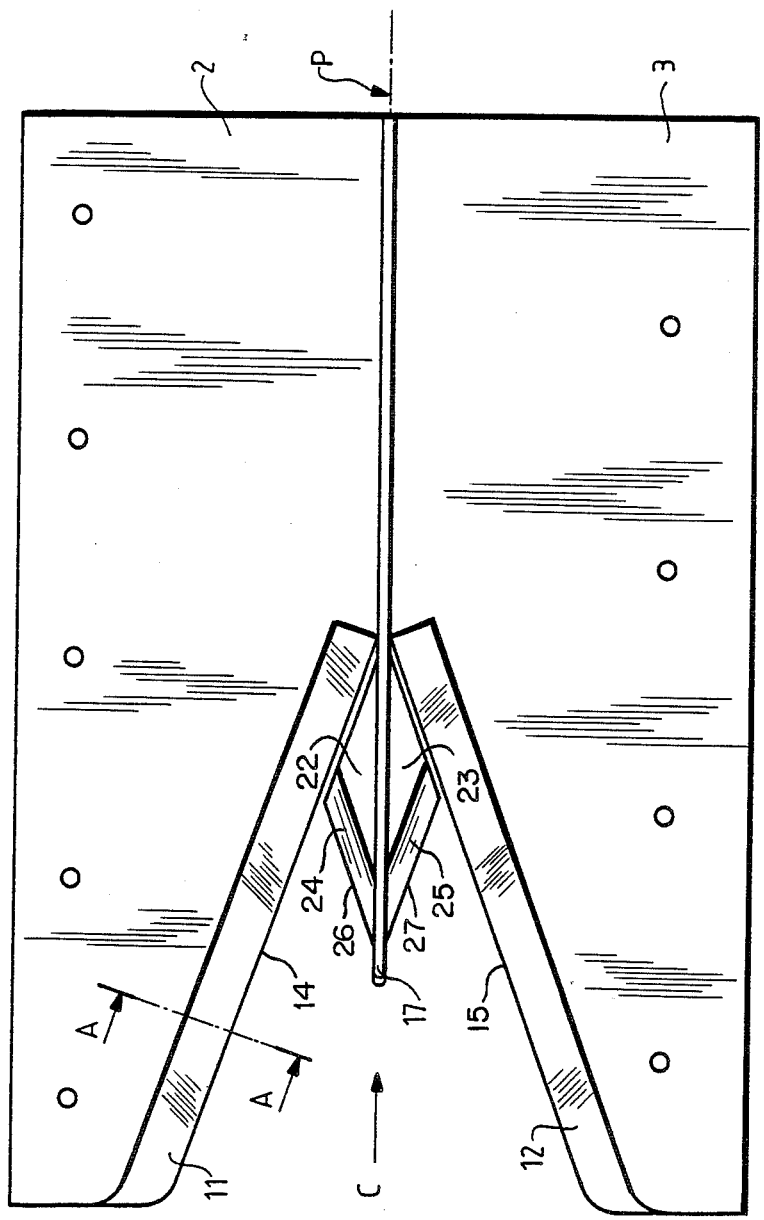
FIG. 2 is a front view of a cutting tool according to the invention.

Blades 2, 3 and 10 and have tapered edges 11, 12 and 13 which have cutting edges 14, 15 and 16, respectively, as shown in FIG. 1. Blade 2 is fastened to a bladeholder 4 connected to a blade support (not shown). Blade 3 is fastened to a bladeholder 5. In this embodiment, the movement of shell 6 in relation to the cutting tool is obtained by directing shell 6 along its longitudinal axis 7 in the direction indicated by arrow F, and leaving the cutting tool stationary. Preferably, junction plane P be approximately in the middle of the thickness e of wall 8 (i.e., at a depth of e/2) so that the tangential cut will be centered in the middle of the wall. Suitable apparatus (not shown) may be used to adjust the position of the blades to accommodate tubular products of different cross-sections.

Figure 4:
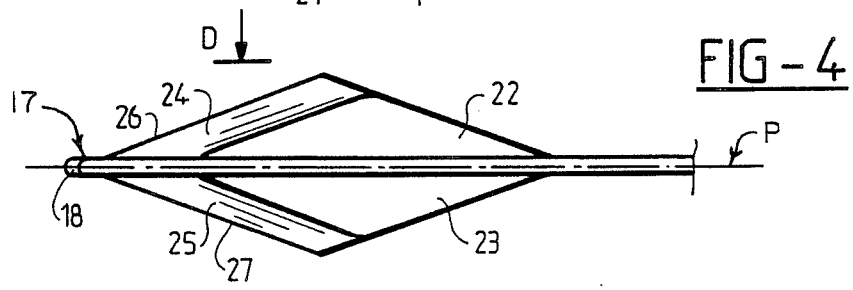
FIG. 4 shows an enlarged view of the additional tangential cutting blade of FIG. 2.
Figure 5:
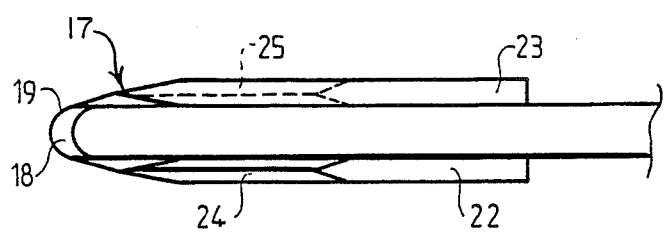
FIG. 5 is a view in the direction of D of FIG. 4.
Figure 7:
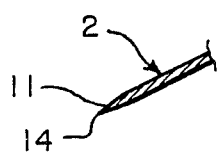
FIG. 7 is a section along line A—A of FIG. 2.
Figure 6:
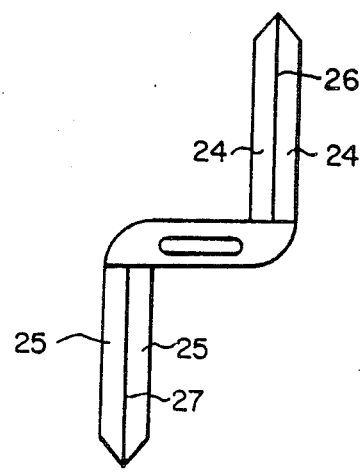
FIG. 6 is a partial view in the direction of C of FIG. 2.

In the preferred embodiment, blade 17 comprises a planar element 18 and two wings 22 and 23, which are perpendicular to planar element 18 as shown in FIGS. 4, 5 and 6. Wing 22 is above the plane of planar element 18, and wing 23 is below the plane of plane part 18. Wings 22, 23 have tapered edges 24, 25 and cutting edges 26, 27, respectively. Wings 22, 23 are mounted in the plane of blades 2, 3 respectively, and make it possible to start from cut 20 at the middle of wall 8 and cut radially outward to meet the cut from blade 2 on the outer surface of wall 8 and cut radially inward to meet the cut from blade 3 on the inner surface of wall 8.

Wings 22, 23 serve to equalize the mechanical stresses within the wall of the fibrous structure due to blades 2, 3. The cutting tool is made to exhibit a total symmetry on both sides of junction plane P. The angle defined by edge 14 of blade 2 and edge 26 of wing 22 is substantially equal to the angle defined by edge 15 of blade 3 and edge 27 of wing 23. Edges 14 and 27 are substantially parallel to each other, as are edges 15 and 26. This symmetry results in a balancing of forces on both sides of junction plane P.

The angle defined by edge 14 of blade 2 and edge 15 of blade 3 is between 30 and 50 degrees, preferably about 40 degrees Likewise the angle defined by edge 14 of blade 2 and edge 26 of wing 22 is between 30 and 50 degrees, preferably about 40 degrees, as is the angle defined by edge 15 of blade 3 and edge 27 of wing 23.

The size of the tool is modified in accordance with the thickness of the wall to be cut and the inside diameter of the product. It is possible to perform cuts in the manner described above for wall thicknesses between about 20 and 150 mm, and inside diameters between about 50 and 350 mm. The blades and their supports are made adjustable to compensate for various wall thicknesses and product diameters. The entire device remains unchanged, the tool is simply detached from the bladeholder and replaced by another one.

In the practice of the invention, a step-shaped cut is made in a wall of tube with the apparatus of FIG. 1 by making tangential cut in the wall as well as at least two spaced-apart radial cuts one of which is made from an exterior surface of the wall and the other of which is made from an interior surface, the two radial cuts going only part way through the wall and intercepting the tangential cut.

What is claimed:

1. A process for forming three longitudinal cuts in the shape of a step along a wall of a fibrous tubular product, comprising the steps of simultaneously:

cutting from an inside surface of said wall of said fibrous tubular product radially outward to a depth within said wall to make a first cut, cutting from an outside surface of said wall of said fibrous tubular product radially inward to a depth within said wall to make a second cut, said first cut and said second cut being approximately parallel and slightly displaced from each other, cutting within said wall to make a third cut tangential to said wall and approximately perpendicular to said first cut and said second cut, cutting from within said wall radially inward in the plane of said first cut to make a forth cut that joins said first cut, and cutting from within said wall radially outward in the plane of said second cut to make a fifth cut that joins said second cut, said fourth and fifth cuts being made simultaneously with said first and second cuts, said third cut joining interior ends of said fourth and fifth cuts.

2. The process of claim 1 characterized in that substantially symmetrical forces are exerted on said wall.

* * * * *